June 1, 1943.  L. DEL RICCIO  2,320,350
CAMERA
Filed March 20, 1939    4 Sheets-Sheet 1
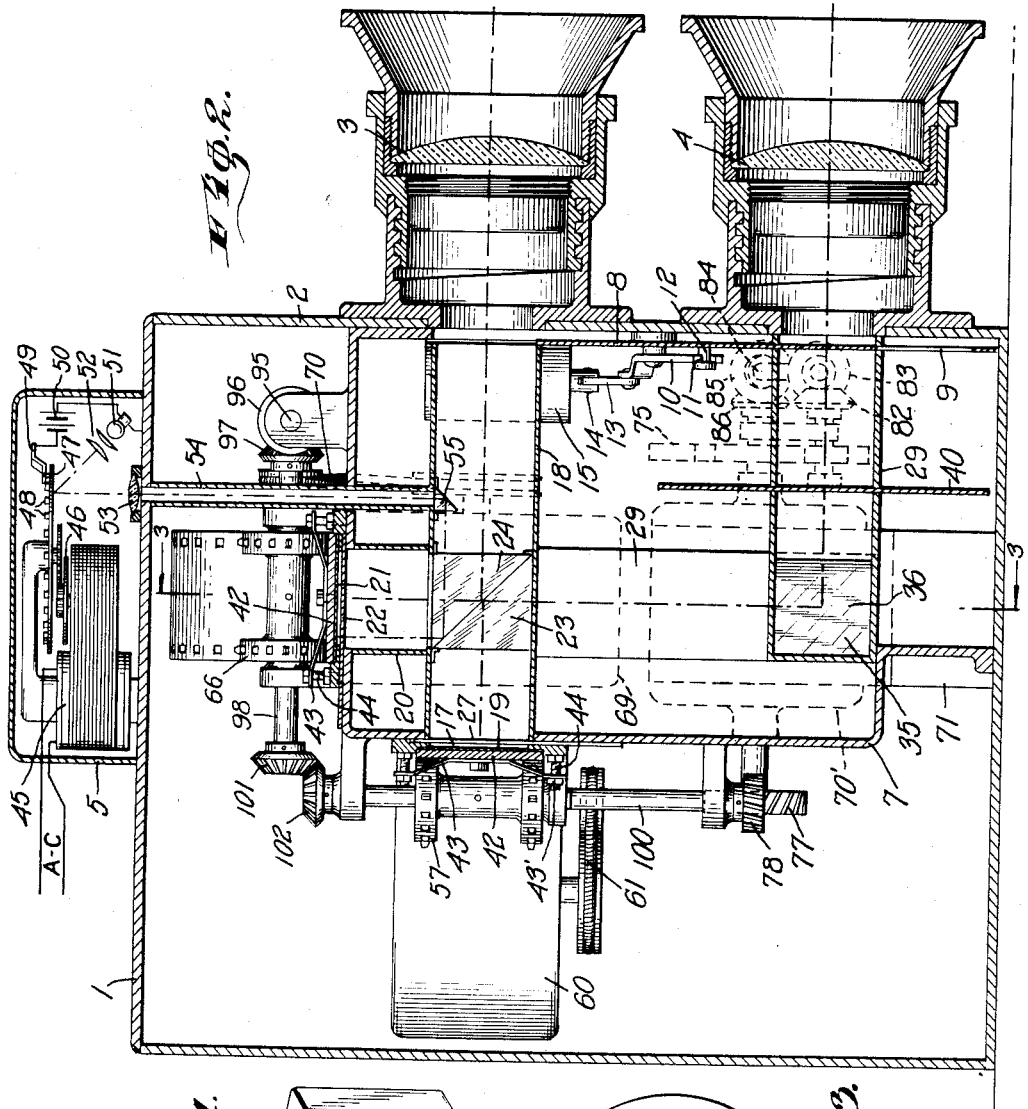
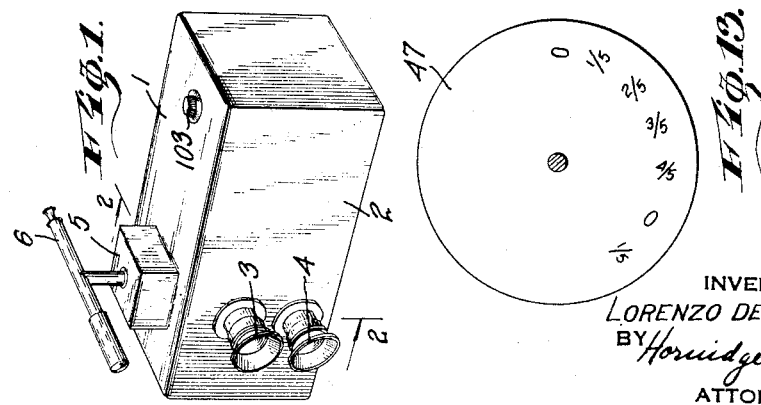
INVENTOR
LORENZO DEL RICCIO
BY *Horridge and Dowd*
ATTORNEY

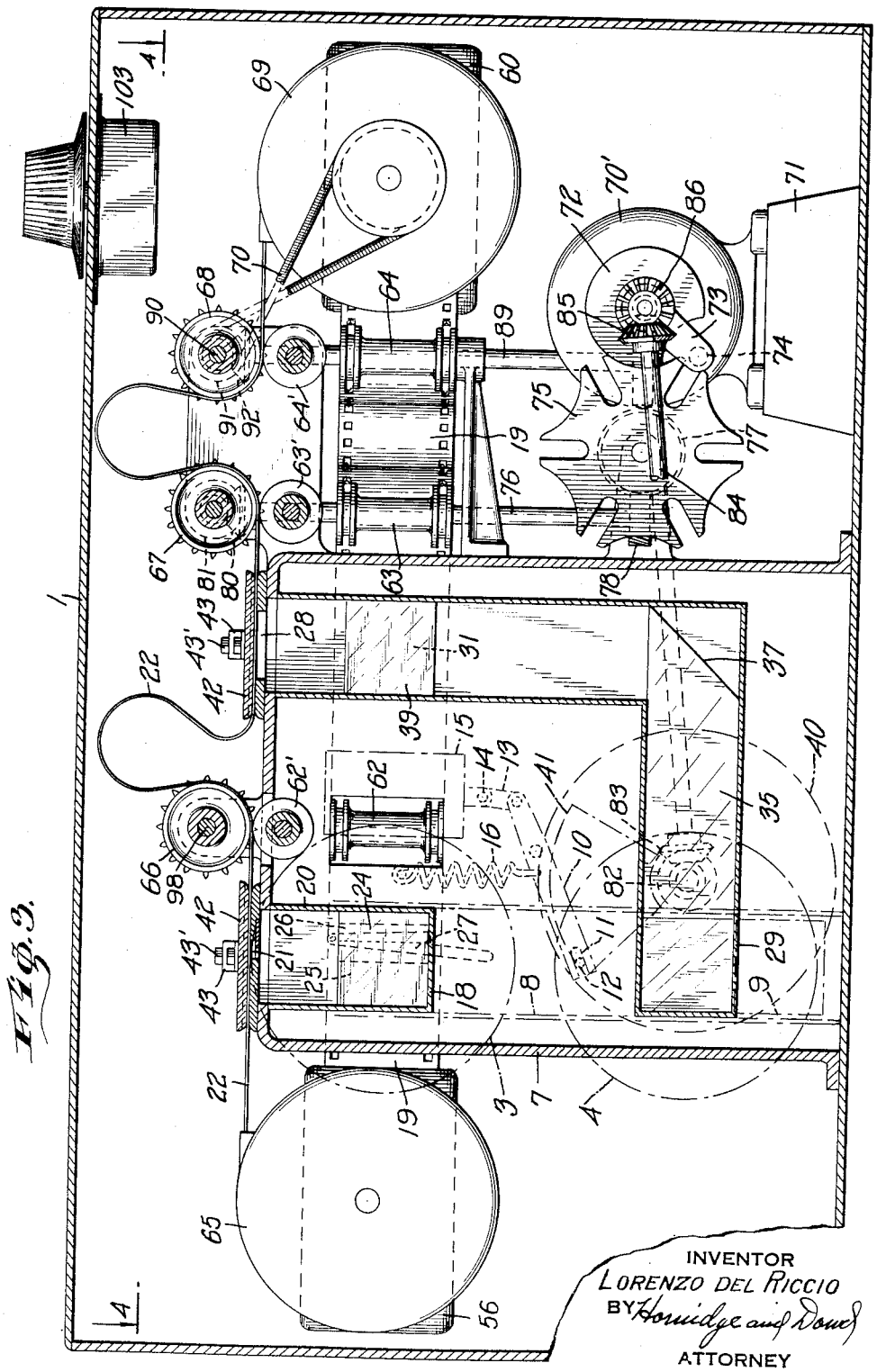

June 1, 1943.  L. DEL RICCIO  2,320,350
CAMERA
Filed March 20, 1939  4 Sheets-Sheet 3
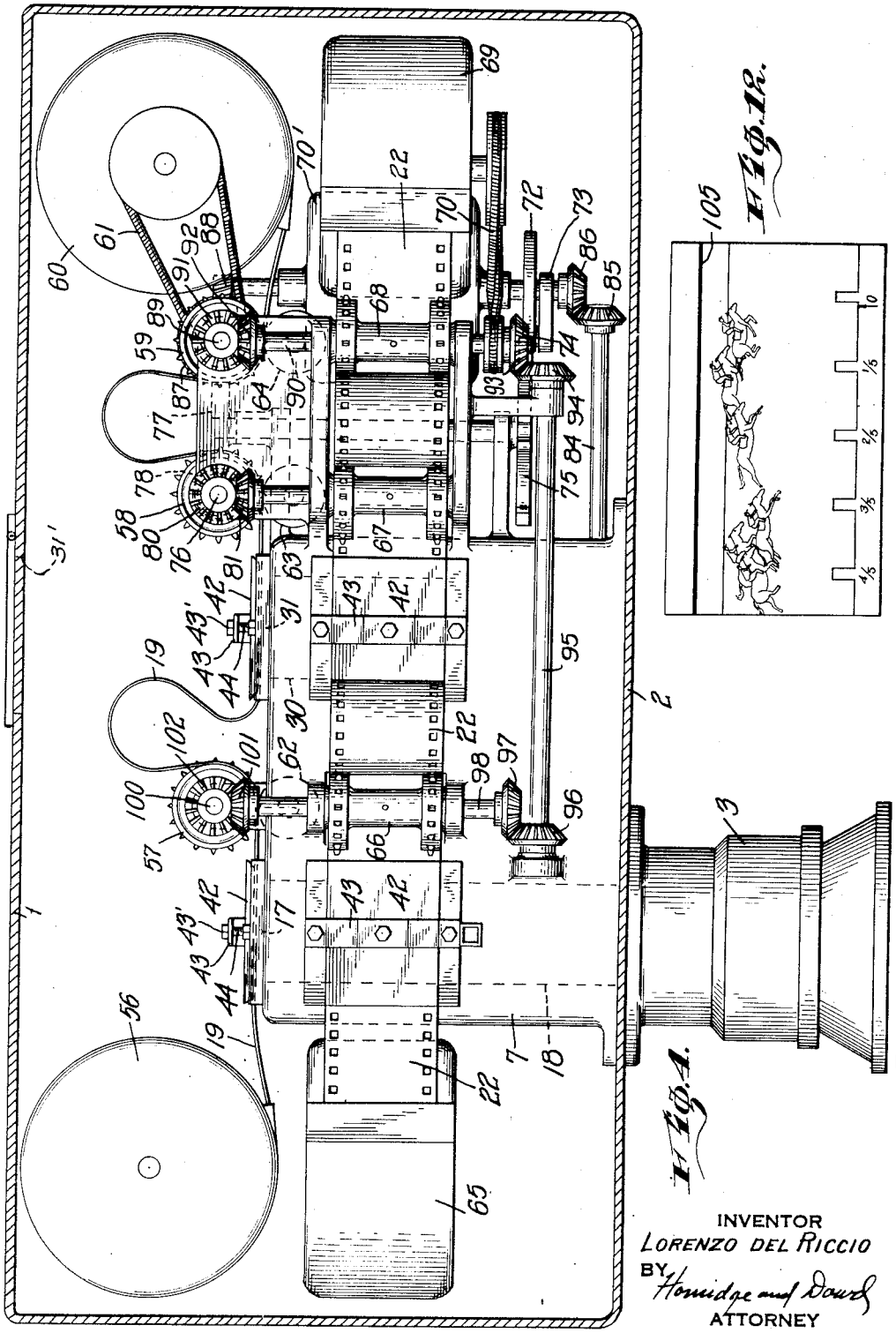

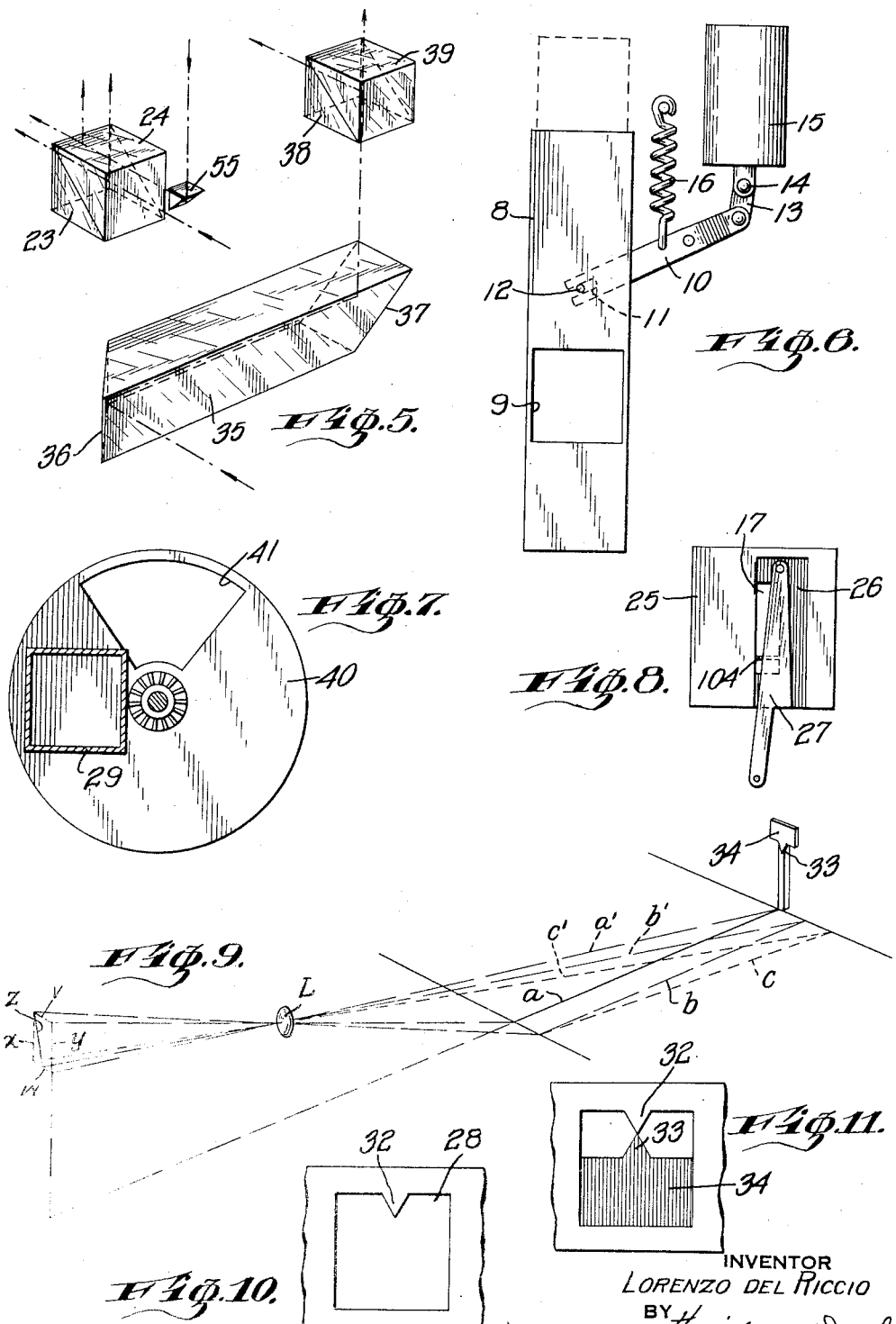

Patented June 1, 1943

2,320,350

UNITED STATES PATENT OFFICE 2,320,350

CAMERA

Lorenzo del Riccio, Los Angeles, Calif.

Application March 29, 1939, Serial No. 262,891

8 Claims. (Cl. 95—11)

This invention relates to a photographic camera and has for its chief object to provide a camera especially adapted to make a photographic record of a succession of moving objects as they cross a given line so that said objects are pictorially represented on a sensitized surface in terms of the relative order and time in and at which they passed such line.

Said invention has for one of its purposes to provide an accurate timing and judging device for races of various types such as of runners, horses, automobiles and the like, whereby a continuous picture is obtained of all the contestants in the order in which they crossed the finish line and thus enable the judges and the spectators to visually, conveniently and accurately determine from said picture the result of such a contest without the possibility of error that is attendant upon a judgment based upon visual perception of the actual contest itself, particularly where the result is close.

The camera heretofore used for that purpose have been high speed motion picture cameras which are set up at one end of the finish line of a race track with the axis of its lens in the same vertical plane as the finish line, and as the competing horses, for instance, approach and cross the finish line, a series of intermittent exposures are made on a length of motion picture film from which the finish of the race could be reproduced at a convenient speed to enable the judges to decide the question as to the order in which the horses finished or an enlargement could be made of the particular frame showing the leading horse directly on the finish line. Such cameras are, however, in many respects unsuitable for that purpose, particularly since there is a space of time between successive individual pictures during which there is no record made of the position of the horses, which may be the precise moment in which the foremost horses crossed the finish line and the preceding and succeeding pictures may not correctly show their relative positions as determinative of the result in a close race.

Moreover, pictures taken with such a camera may involve errors due to parallax, since a photograph of lines extending longitudinally of the camera will represent them as converging, and when the field of view of the camera is not confined to a single narrow strip of even width extending across the track in substantially the same vertical plane as the optical axis of the camera but comprises the usual broad angular field of view of a camera, the nose of a horse furthest across the track from the camera, for instance, may appear in the finished picture as ahead of or behind that of the horse nearest to the camera when in fact they may be both in line, or the horse who appears to be in advance of the other may in fact be behind him.

The camera of the present invention, however, differs essentially from such motion picture cameras and has no such defect, for instead of photographing the finish of the different contestants intermittently on a series of successive individual frames, the camera of the present invention continuously photographs on a traveling film only the passage of the contestants across the finish line, the field of exposure of the traveling film being limited to a very narrow line representing a field of view equivalent to little more than the finish line itself. Thus the resultant photograph shows the contestants strung out in the order in which each of them finished and separated from each other in the photograph a distance proportional to the time between their respective finishes.

Another object is to provide in such a camera means whereby the field of view of said camera, when the camera is placed in its proper operating position where its optical axis is substantially in the same vertical plane as the finish line, is confined to a very narrow strip of substantially the same width throughout from the foreground adjacent the camera on one side of the track to the background on the distant side of the track.

Many other objects and advantages of the invention will appear from the following description of it taken in connection with the accompanying drawings in which:

Fig. 1 is a perspective view of the camera.
Fig. 2 is a view on the line 2—2 of Fig. 1.
Fig. 3 is a view on the line 3—3 of Fig. 2.
Fig. 4 is a view on the line 4—4 of Fig. 3.
Fig. 5 is a diagrammatic view of prisms within the camera for directing the entering rays towards the sensitive surfaces.
Fig. 6 is a shutter with its operating mechanism for opening either one of the lenses of the camera and closing the other.
Fig. 7 is a rotary shutter operated in connection with one of the lenses.
Fig. 8 is an adjustable mask whereby to regulate the size and shape of the exposure slit of the sensitive surfaces.
Fig. 9 is a diagrammatic view in perspective showing how the adjustable slit of Fig. 8 operates to obtain a uniform width of the field longitudinally of the camera.

Fig. 10 is another mask to be interposed in front of the sensitive surfaces.

Fig. 11 shows the image on a sensitive surface of a target placed in the field of the camera to determine in conjunction with the mask of Fig. 10 the position of the camera.

Fig. 12 is a strip of film made in accordance with the invention showing the finish line of a horse race and the order in which the horses finished and the time between them.

Fig. 13 is a disc bearing on its face a series of time notations.

Referring to the drawings, 1 is a light-proof camera box having mounted on the front board 2 thereof two lenses 3 and 4 disposed one above the other with their optical axes in the same vertical plane. 5 is a housing on top of the camera in which is contained a time indicating device and its illuminating means, while mounted above it with its axis in the same vertical plane as the lenses 3 and 4 is a telescope sight 6 which may be provided with a fine wire stretched vertically across the center of its lens.

Lens 3 is used for photographing a field restricted to an extremely narrow strip of uniform width extending longitudinally of said lens and such as would constitute the finish line of a race, while lens 4 is used to photograph a target set up on an extension of the finish line across the track on which the race is run and thus check and determine the position of the camera with respect to said finish line as shown by the recorded image of the target on the sensitive surfaces. Said target may also bear legends indicating, for instance, the date and number of the race.

7 is a box-like supporting frame, preferably of a light metal such as aluminum, within the camera box, in and upon which are mounted various of the optical and mechanical elements of the camera. Slidably mounted within the camera box behind the lenses 3 and 4 is a shutter 8 provided with an aperture 9. 10 is a pivoted lever having a slot 11 engaging a pin 12 on said shutter. The other end of said pivoted lever is connected by the link 13 to the armature 14 of a solenoid 15 mounted on the frame 7. 16 is a coil spring attached to the lever 10 tending to hold the said shutter in one position where the aperture 9 is in register with the lens 4 while at the same time the shutter covers the lens 3. When an electric current controlled by a switch (not shown) is allowed to travel through the winding of the solenoid 15, the armature 14 is retracted and said shutter is moved by the lever 10 against the tension of the coil spring 16 to a position where the lens 4 is closed and one end of the shutter has passed beyond the lens 3 thus opening it.

Mounted within the frame 7 and extending from the lens 3 to the film aperture 17 is a light tube 18 through which the rays entering by the lens 3 are confined in their passage to the surface of a traveling film 19 immediately behind said aperture, which film during the photographing is driven in a direction lateral of said lens 3 and approximately at the same speed and in the same direction as the image of, for example, a horse which is moving across the fild of the lens 3. A branch 20 from said light tube extends at right angles vertically to an aperture 21, similar in all respects to the aperture 17 and behind which there is a traveling strip of sensitized paper 22. Positioned within said light tube 18 where the branch 20 joins the main tube are a pair of right angle triangular prisms 23 and 24 having their diagonal faces cemented together, so that a beam of light entering by the lens 3 is split, one part passing directly through said prisms towards the aperture 17 and the other part being reflected at right angles towards the aperture 21. Thus a view photographed through the lens 3 is simultaneously registered upon both the film 19 and the paper strip 22.

The apertures 17 and 21 are each in the form of a very narrow slit extending transversely across the film and paper strip respectively, and are composed of two thin plates 25 and 26 having their opposite edges parallel. The plate 25 is fixed rigidly with its inside vertical edge on the optical axis of the lens 3, as the said axis extends to said apertures, while the plate 26 is slidable so that the width of the slot is adjustable. Moreover, the plate 26 has pivotally mounted upon its surface adjacent one edge a supplemental plate 27 whereby the adjustable edge of the slit may be disposed at an angle so that the width of the slit may be decreased along its length. The reason for the width and shape of the slit being made adjustable is that since the field of view of the lens 3 is to be limited to a very narrow line of uniform width extending longitudinally of the camera, the width of the exposure area of the film may be altered to accord with the distance of the camera from the track, and since the normal field of view of the lens is angular and increases with the distance from the camera, in order to confine the width of view to the same dimension at the far end of the finish line across the track as at the near end closer to the camera, the pivoted plate may be adjusted so as to narrow the slit towards that edge of the film where the image of the more distant points along the finish line will fall. The width of the slit will vary with the position of the camera, as, for instance, its distance from the track, the width of the track, and other circumstances. In any case, its width will be as narrow as possible consistent with a proper exposure of the traveling film or paper strip behind it.

This is illustrated in Fig. 9 in which the finish line is marked $a$ and the field of view to be covered by the camera lens L is to be limited to a narrow strip of uniform width bounded by the vertical planes defined by the lines $a$ and $a'$ on one side and the lines $b$ and $b'$ on the other. It will be seen that if the width of the exposure area of the film is that defined by the two parallel vertical lines $x$ and $y$, the image projected by the lens L will be that of the field included within the vertical planes $a$—$a'$ and $c$—$c'$; whereas by inclining the edge of the slit towards the end thereof which will receive the image of the background as shown by the line $z$, the portion of the field lying between the vertical planes $b$—$b'$ and $c$—$c'$ will be excluded from registering on a sensitive surface behind the aperture. In other words, let the finish line be represented by $a$ and let $b$, a short distance to one side of $a$ and parallel thereto, define the width of a narrow band of uniform width extending across a racetrack, the beginning and end of said band, together with the lines $a$ and $b$, forming a long, narrow rectangle. With the camera arranged so that the line $a$ is in the same vertical plane with the optical axis of the lens L, the distance between $a$ and $b$ at the end nearest the lens would be represented by the line $v$, the length of the line $a$ by $y$, and the distance between $a$ and $b$ at the end further removed from the lens L would be represented by the line $w$, which is much shorter than $v$ due to the fact that it is at a much greater distance from the lens L. Consequently, the line $b$ will be projected as the line $z$. Since the slit is to permit exposure only of the image of said uniform band between the lines $a$ and $b$, the edge of the slit represented by the line $z$ will be disposed at an angle to the line $y$. If the vertical edges of the slit were parallel as represented by $x$ and $y$, the slit would permit exposure of a constantly diverging band defined by the lines $a$ and $c$.

Mounted within the frame 7 and extending from the lens 4 to a second aperture 28 for the paper strip 22 is a light tube 29 through which the rays entering by the lens 4 are confined in their passage to the surface of the traveling paper strip 22. The aperture 28 is located a short distance beyond the aperture 21 in the line of travel of said paper strip. Said light tube is bent at right angles twice along its length in accordance with the path of said rays as directed by the prisms mounted within it and has a branch 30 extending horizontally to an aperture 31 for the film 19 similar to the aperture 28 and located somewhat beyond said aperture 17 in the line of travel of said film. Said apertures 28 and 31 are each provided with a mask 32 in the form, for instance, of a pointer which is so located in the aperture that when the optical axis of the lens 3 is in the same vertical plane with the finish line, the apex of the pointer portion 33 of a target 34 erected at the other end of said finish line across the track and the apex of said pointer of the mask 32 will coincide, as shown in Fig. 11 and will so appear on the developed film and paper strip exposed behind said apertures 31 and 28.

Mounted within said light tube 29 is a prism 35 of square cross section having one end face 36 disposed at an angle of 45 degrees to the vertical plane of the axis of the lens 4 and with its other end face 37 disposed at an angle of 45 degrees to the horizontal. Directly above the said other end face 37 in said light tube 29 is mounted a pair of right angle triangular prisms 38 and 39 with their diagonal faces cemented together so that a beam of light entering by the lens 4 which has been reflected by the face 36 to the face 37 of the prism 35 and thence vertically to the prisms 38 and 39, is split, one part passing vertically in a straight line through said prisms 38 and 39 to the paper strip 22 behind the aperture 28 and the other part being reflected at right angles towards the film 19 behind the aperture 31.

The travel of the film 19 and the paper strip 22 past the apertures 31 and 28 is intermittent and during their rest periods said film and paper strip are exposed to the light entering by the lens 4 by the rotating shutter 40 mounted on the frame 7 and having therein an opening 41 for intermittently permitting the light entering by the lens 4 to be transmitted to said apertures 28 and 31. Said shutter 40 is so mounted as to cut across the light tube 29 in a slot therein provided for that purpose.

It is of course understood that the planes of the traveling film 19 past the apertures 17 and 31 and of the traveling paper strip past the apertures 21 and 28 are the focal planes of the lenses 3 and 4.

Said film 19 and paper strip 22 are held securely in their respective positions immediately behind the apertures 17 and 31, and 21 and 28, in the focal planes of the lenses 3 and 4, in each case by pressure plates 42 actuated by the flat springs 43. The pressure of said flat springs 43 is adjustable by means of the nuts 43' on the threaded studs 44 so as to permit just sufficient pressure to be applied to the film 19 and the paper strip 22 to hold them accurately in their said positions and at the same time permit them to be drawn freely across said apertures.

Located within the housing 5 on the top of the camera box 1 is an electric clock preferably of the type having a motor driven by alternating current of controlled frequency and comprising a field electromagnet 45 and a permanent magnet armature 46 which is caused to rotate in step with the alternations of the electric current. Connected to said armature by suitable gearing is the rotating disc 47 bearing on its face notations of time in terms, for example, of 1/5 of a second. Mounted on the other face of said disc immediately opposite each of said time notations is a series of switch points 48 adapted to make contact successively with the stationary contact spring 49 and thus close an electric circuit which includes a suitable source of current 50 and an electric lamp 51, preferably a neon lamp, so that as the disc 47 rotates the successive time notations thereon are illuminated by the intermittent flashing of the lamp 51 whose beams are directed towards said time notations by the condenser 52. 53 is a lens whereby beams of light corresponding to the successive images of the said time notations are projected downward into the camera box through the light tube 54 to the reflecting prism 55 from which they are reflected at right angles to the pair of prisms 23 and 24 and are there split and caused to fall upon both the film 19 and paper strip 22 through the slits 17 and 21 near the wider end of said slits which will correspond to the bottom of the finished picture. The diagonal face of the prism 55 is silvered or otherwise rendered opaque and thereby prevents the image projected by the lens 3 from falling upon the marginal portion of the film 19 and the paper strip 22 which is to receive the images of the said time notations.

The speed of the said clock motor and the sizes and arrangement of the gears by which the disc 47 is rotated are such that the speed of said rotating disc near its periphery where said time notations are located corresponds approximately to the average speed of the traveling film 19 and paper strip 22 past the apertures 17 and 21 respectively, and said time notations are spaced thereon in accordance with the time indicated thereby and the speed of rotation of said disc.

The film 19 is preferably standard 35 mm. motion picture film, although it may be of any convenient width, and is caused to travel from a supply reel in a light-proof housing 56 continuously past the slit 17 by means of the sprocket 57 and intermittently past the aperture 31 by the sprocket 58 after which it is fed continuously by the sprocket 59 either to a take-up reel located in the light-proof housing 60 and driven by the belt 61 from a pulley on the shaft of the sprocket 59, or directly into a developing tank or machine installed near the camera. Idle pressure rollers 62, 63 and 64 cooperate with the sprockets 57, 58 and 59 to hold the film 19 on said sprockets.

The paper strip 22 is preferably of the same size as the film 19 and provided with sprocket holes. It is caused to travel in the same manner and in the same direction and at the same speed as the film 19 from a supply reel in a light-proof housing 65 continuously past the slit 21 by means of the sprocket 66 and intermittently past the aperture 28 by the sprocket 67 after which it is fed continuously by the sprocket 68 either to a take-up reel located in the light-proof housing 69 and driven by the belt 70 from a pulley on the shaft of the sprocket 68, or, in the same way as the film 19, directly into a developing tank or machine. Idle pressure rollers 62', 63' and 64' co-operate with the sprockets 66, 67 and 68 to hold the paper strip 22 on said sprockets.

The rotation of the sprockets 57, 58, 59, 66, 67 and 68, as well as the rotary shutter 40 is effected by the electric motor 70' which is mounted on a suitable base 71 within the camera box 1. On the end of the armature shaft of said motor 70' towards the front of the camera is mounted a locking disc 72 and a crank arm 73 provided with a driving pin 74 engaging with the star-wheel 75, thus providing a Geneva movement for the intermittent rotation of the vertical shaft 76 through a pair of spiral gears 77 and 78 attached to said star-wheel 75 and shaft 76 respectively. Said shaft carries the film sprocket 58 and at its upper end a bevel gear 80 meshed with the bevel gear 81 attached to one end of the shaft which carries the paper strip sprocket 67. The relative sizes of the aforesaid gears are such that the film and paper strip are each advanced the distance of one frame with each revolution of the armature shaft of the motor 70', and held at rest while an exposure is made by the synchronous rotation of the rotary shutter 40. The rotary shutter is operatively connected to the front end of the armature shaft of the motor 70' by means of the bevel gears 82 and 83, the shaft 84 and the bevel gears 85 and 86.

The continuous drive for the film sprockets 57 and 59 and for the paper strip sprockets 66 and 68 is taken from the other and rear end of the armature shaft of the motor 70' to which is operatively connected by a pair of spiral gears 87 and 88 the vertical shaft 89 which carries the film sprocket 59. Said shaft at its upper end is operatively connected to the horizontal shaft 90 by a pair of bevel gears 91 and 92 attached to adjacent ends of the shafts 89 and 90 respectively. Said shaft 90 carries the paper strip sprocket 68 and is provided at its front end with the bevel gear 93 meshing with the bevel gear 94 on the end of the shaft 95 which through the bevel gears 96 and 97 drives the shaft 98. Said shaft 98 carries the paper strip sprocket 66, and drives the vertical shaft 100, carrying the film sprocket 57, by means of a pair of bevel gears 101 and 102 attached to the adjacent ends of the shafts 98 and 100 respectively.

The speed of travel of both the film 19 and the paper strip 22 from their respective supply reels past their respective apertures for best pictorial results should be approximately the same as the speed of the images of the horses or other contestants past the slits 17 and 21, and it has been found by experiment that all of the said sprockets may be of the same size and rotate at the same number of revolutions per minute, since the variation in such speed of the film 19 and paper strip 22 past the slits 17 and 21 as called for by the speed of a slower type of contestants such as runners, for example, and a faster type of contestants, such as automobiles, for example, will not affect the exposure at the apertures 31 and 28 beyond the ordinary range of adjustment of the stop opening of the lens 4 to correct it, or the setting of the rheostat 103 which controls the speed of the motor 70' may be changed when exposing through the lens 4 to give the proper exposure at the apertures 31 and 28 since there is no movement of the target which is photographed through said apertures 31 and 28.

To make a photographic record of the finish of a horse race, for example, in accordance with the invention, the camera, suitably threaded with a supply of sensitive film and paper strip, is rigidly mounted on a suitable immovable support on one side of the track at the finish line and at a height slightly above that of the horses and pointed at a slight angle downward so as to embrace a view of all the horses and to avoid the view of one horse being occluded by another horse closer to the camera. The side of the track on which the camera is to be placed will be determined by the direction in which the race is run, since it is necessary that the travel of the film and paper strip be in the opposite direction. The camera is so positioned that the optical axes of its lenses 3 and 4 are at right angles to the course of said track and that the vertical plane of said axes intersects the apex of the pointer 33 of the target 34 which is positioned at the end of the finish line on the other side of the track. Such position of the camera can be readily determined by means of the telescope sight 6 whose optical axis is in the same vertical plane as those of the lenses 3 and. If desired, the telescope sight 6 may be dispensed with and the image of the target viewed on the back of the film 19 behind the aperture 31 through an opening 31' in the back of the camera provided for that purpose, the pressure plate 42 behind the aperture 31 having been temporarily removed for that purpose and the film held close to the aperture 31 and the position of the camera adjusted until the apex of the pointer 33 coincides with the apex of the pointer of the mask 32. In this position the fixed edge of the slit 17 formed by the plate 25 is in the vertical plane of the finish line and the width of the slit extends therefrom in the same direction as the travel of the film 19 and the paper strip 22. The said slit is then adjusted to the desired width and the angular adjustment of the opposite edge is made so as to confine the exposure area of the film and the paper strip to the image of a narrow band of uniform width across the track. The extent of such angular adjustment may be determined by calculation or by viewing the image of the field on the back of the film behind said slit and may be performed manually within the camera. The slit 21 is similarly adjusted to the same size and shape as the slit 17. The camera is then rigidly fastened in its said position and is ready to be operated, the shutter 8 being in its normal position with the lens 3 closed and the lens 4 open.

A short time before the end of the race, for instance, when the horses are coming into the homestretch, the electric motor and the electric clock which are connected to a suitable source of electric current are put in operation and a number of photographs made of the target 34 on the traveling film and paper strip through the apertures 31 and 28, thereby making a photographic record of the position of the camera with respect to said target and authenticating the fact that the subsequent exposures made on said film and paper strip through the slits 17 and 21 with the camera in the position in which it was set represent what took place exactly at the finish line.

As the horses approach the finish line a current of electricity is switched through the solenoid 15 thus causing the shutter 8 to be moved and held in the position where the lens 4 is closed and the lens 3 is open. It is understood that the speed of the motor has been adjusted by the rheostat 103 so that the film 19 and paper strip 22 are traveling past the slits 17 and 21 at the estimated speed at which the images of the horses will cross said slits when said horses cross the finish line, and then as the horses do cross the finish line the images of them will be registered upon the traveling film 19 and paper strip 22 in the relative order and time in which each said horse crossed the finish line. At the same time, while the film 19 and paper strip 22 are traveling past the slits 17 and 21, the intervals of time shown by the notations on the clock driven disc 47 are photographed on the said film and paper strip through said slits and will appear in the finished picture along the lower margin thereof. Thus the finished picture will show not only the relative order in which the horses finished, but also the difference in time between them. Such a picture is shown in Fig. 12.

It will be noted that the picture thus produced will be characterized by the absence from it of all objects or figures within the field of view of the camera lens, other than the horses themselves and their respective jockeys. Because of the continuous movement of the film and paper strip, each of the fixed objects such as the track itself, structures, the target 34, etc., and background scenery, will not be defined or appear as such in the picture but will be present only as a formless area of a gray tone corresponding to its light intensity, extending throughout the length of the picture, while the horses whose images are moving with the film and paper strip will appear thereon in distinct form. This serves to emphasize the definition of the images of the horses so that they stand out distinctly and their relative positions are easily determined by the eye free from any confusion with images of surrounding objects.

While it is desirable that the speed of the traveling film and paper strip should be the same as that of the images of the horses as they travel across the slits in the direction of the traveling film and paper strip, it is not essential that their respective speeds be exactly the same. If the film and paper strip should be traveling faster than the images of the horses, it will only result in distorting the picture of the horses along their length by elongating their appearance and if the film or paper strip is traveling more slowly than the images of the horses, it will result in shortening the length of the pictures of said horses but the relative position of said horses and the distance in terms of the time between them in the picture will not be thereby affected.

Immediately after the last horse has crossed the finish line, the solenoid circuit is opened whereby the shutter 8 is retracted by the spring 16 to its former position, and, as the camera continues to run for a short period, a number of successive photographs are again made of the target 34 through the lens 4 thus forming at the end of the race, as well as at the beginning, a satisfactory check upon the correctness of the position of the camera in recording the passage of the horses past the finish line and providing on the film and paper strip a notation of the date and number of the race or any other data appearing on the target.

Either the film 19 or the paper strip 22 or both of them are then immediately developed, preferably to produce a reversed positive, from which the judges of the race can easily determine the order in which the horses crossed the finish line and the interval of time between them, and the film may be projected on a large screen to be viewed by the spectators. There may be a time, however, when the race is so close that the extension of the nose of one horse beyond the other is hardly discernible by the unaided eye, and as an aid for the accurate determination of such a question, the slits 17 and 21 may be bridged near one end thereof by a thin opaque strip 104 adjacent said end of the slits and at right angles thereto, which will have the effect of producing in the finished positive picture a thin black line 105 extending longitudinally along said film and paper strip from which a vertical line representing the finish line may be erected by means, for instance, of a tri-square whereby the determination may be accurately and definitely made as to the nose of which horse occupies the more advanced position on said picture and which was therefore the first to cross the finish line. Obviously the specific construction of my invention as illustrated and described may be varied in many respects without departing from the invention as defined in the appended claims.

What I claim is:

1. In a camera provided with a lens and means for causing a sensitized strip to travel in the focal plane of the lens, means for confining the field of view of said camera as registered on said sensitized strip to the portion thereof defined by two parallel planes extending longitudinally of said camera, said means comprising a narrow aperture slit positioned in front of the plane of travel of said strip, said slit being defined by members at least one of which is slidably mounted relative to another and at least one of which is pivotally mounted thereby to vary both the width of said slit and the angular relationship of the opposite edges of said slit, whereby the opposite edges of said slit may conform to the image of said field of view, and means for causing said sensitized strip to travel continuously in a direction at right angles to said slit.

2. In a camera provided with a lens and means for causing a sensitized strip to travel in the focal plane of the lens, means for confining the field of view of said camera as registered on said sensitized strip to the portion thereof defined by two parallel planes extending longitudinally of said camera, said means comprising a narrow aperture slit positioned in front of the plane of travel of said strip, said slit being defined by a stationary member, a slidable member and a third member pivotally mounted on said slidable member thereby to vary both the width of said slit and the angular relationship of the opposite edges of said slit, whereby the opposite edges of said slit may conform to the image of said field of view, and means for causing said sensitized strip to travel continuously in a direction at right angles to said slit.

3. In a camera provided with a lens for recording on a continuously moving sensitized strip the passage of moving objects across a narrow band of uniform width throughout its length extending longitudinally of the camera and delimited by two lines, one of which is in the same vertical plane with the optical axis of said lens and the other is adjacent and parallel thereto, a narrow aperture slit positioned immediately in front of the plane of travel of said strip, one edge of said slit being positioned in the same vertical plane with the optical axis of said lens and the opposite edge being disposed at an angle thereto and coincident with the projected image of said second mentioned delimiting line, and means for causing said strip to travel continuously in a direction at right angles to said first mentioned edge of said slit.

4. In a camera provided with a lens for recording on a continuously moving sensitized strip the passage of moving objects across a narrow band of uniform width throughout its length extending longitudinally of the camera and delimited by two lines, one of which is in the same vertical plane with the optical axis of said lens and the other is adjacent and parallel thereto, a narrow aperture slit positioned immediately in front of the plane of travel of said strip, said slit being formed of a stationary member with its slit defining edge positioned in the same vertical plane with the optical axis of said lens, and at right angles to the direction of travel of said sensitized strip, and a second member pivotally mounted adjacent one end of its slit defining edge thereby to vary the angular relation of the opposite edges of said slit, and means for causing said sensitized strip to travel continuously in said direction.

5. In a camera provided with a lens for recording on a continuously moving sensitized strip the passage of moving objects across a narrow band of uniform width throughout its length extending longitudinally of the camera and delimited by two lines, one of which is in the same vertical plane with the optical axis of said lens and the other is adjacent and parallel thereto, a narrow aperture slit positioned immediately in front of the plane of travel of said strip, said slit being formed of a stationary member having its slit defining edge positioned in the same vertical plane with the optical axis of said lens and at right angles to the direction of travel of said sensitized strip, a second member pivotally mounted adjacent one end of its slit defining edge on a slidable support, thereby to vary both the width of said slit and the angular relation of the opposite edges of said slit, and means for causing said sensitized strip to travel continuously in said direction.

6. In a camera provided with a lens for recording on a continuously moving sensitized strip the passage of moving objects across a narrow band of uniform width throughout its length extending longitudinally of the camera, a narrow aperture slit positioned immediately in front of the plane of travel of said strip, the contour and position of said slit being such that the opposite edges of said slit are coincident with the projected images of the edges of said band, and means for causing said sensitized strip to travel continuously in a direction at right angles to said slit.

7. In a camera provided with a lens for recording on a continuously moving sensitized strip the passage of moving objects across a narrow band of uniform width throughout its length extending longitudinally of the camera and delimited by two lines, one of which is in the same vertical plane with the optical axis of said lens and the other is adjacent and parallel thereto, a narrow aperture slit positioned immediately in front of the plane of travel of said strip, one edge of said slit being positioned in the same vertical plane with the optical axis of said lens and the opposite edge being disposed at an angle thereto and coincident with the projected image of said second mentioned delimiting line, and means for moving said strip in a direction at right angles to said slit.

8. Means for photographically recording the order in which a plurality of contestants cross the finish line of a race course, comprising a camera mounted at one end of the finish line with the optical axis of the lens in the same vertical plane as the finish line, means for continuously moving a sensitized strip in the focal plane of said lens, an aperture slit positioned immediately in front of said sensitized strip, one of the edges of said slit coinciding with the projected image of said finish line and the opposite edge of said slit disposed at an angle thereto sufficient to restrict the field of view projected by said lens to a short distance alongside said finish line of uniform width throughout its length, the direction of continuous travel of said sensitized strip being at right angles to said slit.

LORENZO DEL RICCIO.